UNITED STATES PATENT OFFICE

LEONARD SMIDTH, OF NEW YORK, N. Y.

UREA-FORMALDEHYDE CONDENSATION PRODUCT AND METHOD OF PRODUCING SAME

No Drawing. Application filed December 24, 1927. Serial No. 242,520.

The object of my invention is to produce a urea-formaldehyde condensation product which will contain a greater proportion of urea than has heretofore been thought possible, which product at the same time will be solid and transparent, which will not disintegrate, crack or darken on long continued exposure to light, air and moisture and which will transmit the maximum of ultra-violet light.

In the United States Letters Patent to John No. 1,355,834, dated October 19th, 1920, for the manufacture of aldehyde condensation product capable of technical utilization, there is described the use of approximately five parts of a 40% formalin solution to one part of urea, without any condensing agent. This procedure resulted in a product which was very unstable on exposure to weather, in addition to many other disadvantages. In the United States Letters Patent to Pollak No. 1,458,543, dated June 12th, 1923, for the condensation product and method of making same, the product of the John patent was improved upon by the use of a basic condensing agent and by reducing the amount of formaldehyde to less than three moles (gram equivalents) to one mole of urea. In the United States Letters Patent to Pollak and Ripper No. 1,507,624, dated September 9th, 1924, for the process for manufacturing condensation products, the product was further improved by taking up the excess formaldehyde which was found to remain at the end of the original procedure, by reacting it with more urea. The examples in this patent show that enough urea was added to bring the proportion of urea to formaldehyde used in the final product to approximately one mole of urea to two moles of formaldehyde. The Society of Chemical Industry in Basle (see British Patent 249,101 and French Patent 611,271) obtained a still better product by increasing the urea-formaldehyde ratio to 1.1 moles of urea to 2 moles of formaldehyde, by adding extra urea together with an acid or acid-forming substance. It was stated that when a greater proportion of urea than this was used, the products became milky and finally opaque.

I have discovered a method whereby a greater proportion than heretofore thought possible can be added up to an approximate proportion of 1.3 moles of urea to 2 moles of formaldehyde without producing cloudiness. The resulting product transmits much more ultra-violet light than any similar substance previously produced and is much more resistant to the affects of weather.

A suitable general procedure is the following:

One mole of urea is boiled for a short time in formalin solution containing two moles of formaldehyde, and of a hydrogen ion ($pH^+$) value above four. This comprises the first stage of the reaction, viz., the formation of dimethylol-urea. Further boiling of the solution causes condensation of the dimethylol-urea, and the rate of this condensation may be regulated by controlling the hydrogen ion concentration. Two molecules of dimethylol-urea condense, splitting off one molecule of formaldehyde and two of water, so that if the reaction were completed without further addition of urea, one-fourth of the formaldehyde originally used would be present in a free state at the end. This I have determined quantitatively. The following has been found to be a good method of determining the extent of the reaction. Formaldehyde is determined by the hydrogen peroxide method. This determines not only the free formaldehyde, but also that contained in the dimethyllol-urea present. Then by subtracting the amount shown by the analysis from the amount originally used, the amount that has gone into the final product is found. From the following equation, the extent of the reaction and the amount of free formaldehyde can readily be calculated:

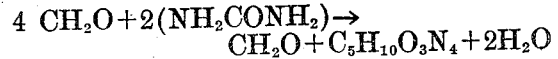

$$4\ CH_2O + 2(NH_2CONH_2) \rightarrow \\ CH_2O + C_5H_{10}O_3N_4 + 2H_2O$$

The rate of condensation being controlled by the hydrogen ion concentration, and the amount of free formaldehyde present at any given time being known, urea is added either at one time, or in several portions, or continuously, depending on the quality of final product desired, the addition being so adjusted in any case so that there is always a small amount of free formaldehyde present. The reaction should be carried as far as possible, so that the maximum amount of formaldehyde is formed, and the greatest possible amount of urea added.

Working according to the present invention, the production of a clear, colorless product of the highest quality and transparency to ultra-violet light is assured, whereas procedures specified in previous patents either gave an inferior material, due to more formaldehyde being present in the final product; or, if larger proportions of urea were added, cloudiness developed or inconstant results were obtained. It has been found that the transparency to ultra-violet light decreases as the amount of free formaldehyde present increases.

The production of a condensation product with the smallest proportion of free formaldehyde, according to the present invention, calls for the continuous addition of the extra urea, so that the formaldehyde given off in the second stage of the reaction is continually taken up by the added urea. The dimethylolurea formed from the extra urea is thus condensed to give off more formaldehyde, so that the final product contains a large proportion of combined urea, although a small excess of formaldehyde was present throughout the reaction.

The reaction, and the addition of urea, are continued by boiling to the furthest possible point, without, however, carrying the material to the point where it would prematurely gelatinize before being cast. As much water as possible is then removed by vacuum distillation. Urea could also be added during the distillation, if desired.

After most of the water has been distilled off, and the material arrived as near as possible to the point for casting, more acid may be added to accelerate the hardening and the drying, so that the ageing will be complete in a minimum of time. The addition of a larger proportion of acid during the condensation and distillation is not feasible because it would speed the reaction beyond control.

After vacuum distillation, the product is poured into molds and allowed to gelatinize. Gelatinization may be accelerated by either heating or cooling. As soon as the product is sufficiently firm, it is stripped from the molds and dried at a temperature below 100° C., when it is converted into a hard, transparent body.

If so desired, any suitable coloring matter may be introduced into the mixture at any convenient or suitable time.

It is to be understood that other substances in addition to urea may be added, such for instance as thiourea, phenol, or any substances which react with formaldehyde under the conditions of the reaction to give a suitable final condensation product. For example, the proportion of urea to formaldehye in the condensation products is brought above 1.1 moles of urea to 2 moles of formaldehyde by the addition of extra urea, and after this urea has reacted, the additional substance is added up to an amount calculated to take up all the free formaldehyde present at the time of addition, as well as that subsequently formed. The final product then would contain a minimum of free formaldehyde.

*Examples*

1. Fifty cc. formalin solution of pH+5.0, containing 39% formaldehyde (19.5 gm.) were refluxed with 19 gm. of urea. After five minutes boiling, fifteen drops of normal formic acid were added, and the boiling continued for 25 minutes. 3 gm. of urea were then added, leaving some excess formaldehyde. Heating was continued five more minutes, after which the water was distilled off under diminished pressure. When the liquid became quite viscous, 5 cc. normal formic acid was added to the solution, and distillation continued to the point of greatest possible viscosity. The product was cast into molds, gelatinized, stripped from the molds and hardened at a temperature below 100° C.

2. Procedure was the same as above until the addition of the acid. Then 10 minutes later 2 gm. of urea were added, 18 minutes later one gm. urea was added and refluxing continued for several minutes longer. During the vacuum distillation another gm. of urea was added. Some formaldehyde was present in excess after each addition of urea. When the vacuum distillation was completed the product was cast into molds, gelatinized, stripped, and hardened at a temperature below 100° C.

3. Procedure was the same as in (1) till the addition of fifteen drops of acid. Then a solution of 5 gm. of urea in 10 cc. water was run in at a rate to follow the formation of formaldehyde, at the same time making sure that there was some slight excess of formaldehyde present at all times. Refluxing was continued during this addition. After all the solution was added, the water was distilled off, the product cast into molds, gelatinized, stripped from the molds and hardened at a temperature below 100° C.

What I claim is:—

1. The process of forming a transparent urea formaldehyde condensation product which consists in reacting urea with formaldehyde to an advanced stage without causing gelatinization and adding more urea in a proportion of less than one mole for every two moles of free formaldehyde, so that the proportion in the final product is from 1.1 to approximately 1.3 moles of urea to 2 moles of formaldehyde.

2. The process of forming a transparent urea formaldehyde condensation product which consists in reacting urea with formaldehyde to give an intermediate condensation product which gives up a quantity of free formaldehyde and adding more urea in a proportion of less than one mole to combine with every two moles of free formaldehyde, so that the proportion in the final product is from 1.1 to approximately 1.3 moles of urea to every 2 moles of formaldehyde.

3. The process of forming a transparent urea formaldehyde condensation product which consists in reacting urea with formaldehyde and continuously adding urea in a proportion not exceeding one mole for every two moles of free formaldehyde present at the time of addition.

4. The process of forming a transparent urea formaldehyde condensation product which consists in reacting urea with formaldehyde and continuously adding urea in a proportion not exceeding one mole for every two moles of formaldehyde capable of combining with the said added urea at the time of addition.

5. The process of forming a transparent urea formaldehyde condensation product which consists in reacting urea with formaldehyde and continuously adding urea in a proportion not exceeding one mole for every two moles of formaldehyde present at the time of addition, the final product representing a proportion of from 1.1 to approximately 1.3 moles of urea to 2 moles of formaldehyde.

6. The process of forming a transparent urea formaldehyde condensation product which consists in reacting urea with formaldehyde at a hydrogen ion value (pH) above four to form dimethylol urea, condensing the dimethylol urea to form the condensation product and free formaldehyde, then taking up this formaldehyde with added urea in a proportion not exceeding one mole for every two moles of formaldehyde, so that the final product will represent a proportion of from 1.1 to 1.3 moles of urea to 2 moles of formaldehyde.

7. The process of forming a transparent urea formaldehyde condensation product which consists in condensing dimethylol urea to form the condensation product and formaldehyde, then taking up this formaldehyde with added urea in a proportion not exceeding one mole for every two moles of free formaldehyde present, so that the final product will represent a proportion of from 1.1 to 1.3 moles of urea to two moles of formaldehyde.

8. The process of forming a transparent urea formaldehyde condensation product which consists in reacting urea with formaldehyde to an advanced stage without causing gelatinization, adding extra urea so that the proportion in the final product is from 1.1 to approximately 1.3 moles of urea to two moles of formaldehyde and adding thiourea so that there is a minimum of free formaldehyde in the final product.

9. The continuous process of reacting urea with formaldehyde to form dimethylol-urea, condensing dimethylol-urea to form the condensation product and free formaldehyde, then adding urea and reacting the free formaldehyde present with said added urea to form dimethylol-urea, condensing this to give off a further quantity of product and free formaldehyde and repeating this procedure so that the final product represents one having a minimum of free formaldehyde.

10. A transparent urea formaldehyde condensation product in which the proportion of urea to formaldehyde is from over 1.1 up to approximately 1.3 moles of urea to two moles of formaldehyde.

In testimony, that I claim the foregoing as my invention, I have signed my name this 22nd day of December 1927.

LEONARD SMIDTH.